US010915567B1

(12) United States Patent
Zhang (10) Patent No.: US 10,915,567 B1
(45) Date of Patent: Feb. 9, 2021

(54) CONTENT SELECTION METRIC DETERMINATION FOR A CONTENT DISTRIBUTION SYSTEM

(71) Applicant: Facebook, Inc., Menlo Park, CA (US)

(72) Inventor: Li Zhang, Foster City, CA (US)

(73) Assignee: Facebook, Inc., Menlo Park, CA (US)

( * ) Notice: Subject to any disclaimer, the term of this patent is extended or adjusted under 35 U.S.C. 154(b) by 161 days.

(21) Appl. No.: 15/922,826

(22) Filed: Mar. 15, 2018

(51) Int. Cl.
  *G06F 17/00* (2019.01)
  *G06F 16/435* (2019.01)
  *G06F 16/907* (2019.01)
  *G06F 16/9535* (2019.01)
  *G06F 16/735* (2019.01)

(52) U.S. Cl.
  CPC .......... *G06F 16/435* (2019.01); *G06F 16/907* (2019.01); *G06F 16/9535* (2019.01); *G06F 16/735* (2019.01)

(58) Field of Classification Search
  CPC . G06F 3/01; G06F 3/167; G06F 9/451; G06F 16/355
  See application file for complete search history.

(56) References Cited

U.S. PATENT DOCUMENTS

| 2009/0144753 A1* | 6/2009 | Morris | G06F 40/14 719/318 |
| 2011/0072278 A1* | 3/2011 | Izu | G06F 21/64 713/193 |

\* cited by examiner

*Primary Examiner* — Truong V Vo
(74) *Attorney, Agent, or Firm* — Fenwick & West LLP (57) ABSTRACT

A content distribution system determines a content selection metric that allows the content distribution system to evaluate whether a content provider maximizes its net content value by stating the true content value of presenting content items by the content distribution system. The content distribution system determines net content values of presented content items and re-performs content selection processes based on modified content value offers. The content distribution system then determines sets of alternative net content values and compares the alternative net content values to the corresponding net content values to determine if the content provider can achieve a greater net content value with a content value offer that does not match the stated content value of presenting the content value. The content distribution system then determines a content selection metric based on the compared net content values and alternative net content values.

20 Claims, 4 Drawing Sheets

CONTENT SELECTION METRIC DETERMINATION FOR A CONTENT DISTRIBUTION SYSTEM

BACKGROUND

Content distribution systems distribute content to users that are of interest to the users. The content distribution system can receive content items from users or from content providers in exchange for content value. Content value is a value that can be exchanged between the content provider and the content distribution system to improve the placement of content items associated with the content provider. Content distribution systems can use complex models that are used to select content items to be presented to users. The models can balance the interests of the user with content value provided by content providers for presenting their content items. Typically, a content provider will designate content value associated with presenting the content provider's content. This may be based on a value for presenting the content or based on a further interaction by a user in relation to the content. The content distribution system uses the stated value to select content. In many cases, after applying models (e.g., for user interaction), and consideration of other content for presentation, the content value allocated to selection of a content item may vary from the stated value of the content item. For example, the content may be selected based in part on an auction, which may be a second-price auction, and the allocated content value may be discounted from the stated value of the content item if the content item is to be presented in a sub-optimal position in a user interface. However, it can be difficult to determine whether the allocated content value is a fair value for the presentation of the content item, due to the complexity of models and processes used to determine the allocated content value. It is critical that a content distribution system determine fair content value allocations; otherwise the content distribution system risks losing content providers from using the content distribution system.

SUMMARY

A content distribution system determines a content selection metric that allows the content distribution system to evaluate whether a content provider maximizes its net content value by stating the true content value of presenting content items by the content distribution system. Stated another way, the content distribution system is typically designed with the intent that a content provider achieves the best results when the content provider states the "true" or actual value of a content item to the content distribution system, and that a content provider does not achieve improved results with respect to this true value if the content provider were to state a value upwards or downwards of true, or actual value. Thus, the content selection metric evaluates whether the content distribution system actually selects content optimally for a stated content value.

The content distribution system receives a content item from a content provider along with a content value offer for presenting the content item to users. The content distribution system uses a content selection process to select content items for presentation to users of the content distribution system. The content selection process uses a content selection model of user interests in content items and the content value offers of content providers to determine which content items to present to a user. The content items selected by the content distribution system may include one or more content items from content providers. A content provider may state the content value of its content items by offering an amount of content value to the content distribution system for presenting the content item, and the content distribution system can use the stated content value of the content item and the actual amount of content value allocated to the content distribution system by the content provider for selecting the content item to determine a net content value to the content provider for presenting the content item.

The content distribution system then determines a set of alternative net content values to the content provider by re-performing the content selection process with modified content value offers from the content provider. The content distribution system applies a set of modifiers to the content value offer made by the content provider and re-performs the content selection process with the modified content value offers. The content distribution system may keep constant all other factors that may affect the content selection process for the re-performed content selection process. The content distribution system re-performs the content selection process and calculates, for each instance of a re-performed content selection process, an alternative net content value that represents the net content value the content provider would have received if the content provider had offered the modified content value for the selection process, rather than the stated value.

The content distribution system uses net content values and alternative net content values associated with content providers to calculate a content selection metric that represents the extent to which alternative net content values exceed their corresponding net content values. The content distribution system compares the net content value for each instance of the content selection process to the alternative net content values for re-performances of the content selection process and, if one of the alternative content values exceeds the net content value from the content selection process, then the content distribution system determines that the content selection process did not fairly select the content provider's content item in accordance with the stated content value of the content item. The content distribution system identifies a set of instances of the content selection process where a content provider's content item was not fairly selected.

The determined content selection metric allows developers of the content distribution system to easily monitor the content selection process used by the content distribution system and determine when the content selection process does not effectively select content based on the stated content value. By monitoring the content selection metric over time, changes in the metric can automatically identify when a change or update to the content distribution system positively or negatively impacts the efficacy of selecting content consistent with the stated content value and verify that the different factors and models of content selection are working effectively. Thus, the content selection metric is a useful tool that developers can to improve the performance of the content distribution system.

DETAILED DESCRIPTION

Example System Environment and Architecture

Figure 1:
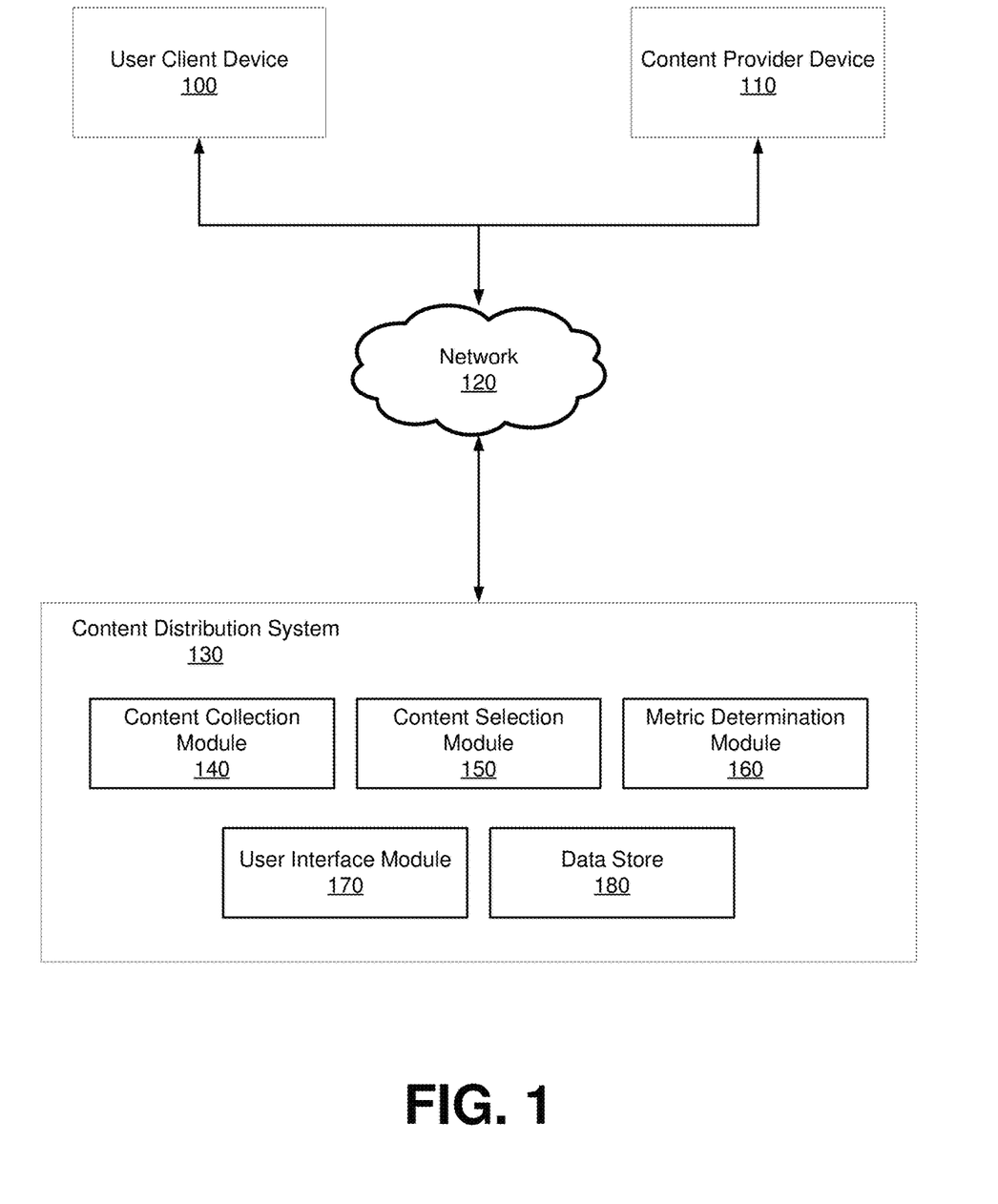
FIG. 1 illustrates an example system environment and system architecture for a content distribution system, in accordance with some embodiments.

Figure (FIG. 1 illustrates an example system environment for a content distribution system 130, in accordance with some embodiments. The system environment illustrated in FIG. 1 includes a user client device 100, a content provider device 110, a network 120, and a content distribution system 130. Alternate embodiments may include more, fewer, or different components from those illustrated in FIG. 1, and the functionality of each component may be divided between the components differently from the description below. Additionally, each component may perform their respective functionalities in response to a request from a human, or automatically without human intervention.

A user can interact with the content distribution system 130 through a user client device 100. The user client device 100 can be a personal or mobile computing device, such as a smartphone, a tablet, a laptop computer, or desktop computer. In some embodiments, the user client device 100 executes a client application that uses an application programming interface (API) to communicate with the content distribution system 130 through the network 120. The user client device 100 presents content from the content distribution system 130 to the user via a display of the user client device 100. The user client device 100 can also receive interactions from the user with content of the content distribution system 130 and can transmit the interactions to the content distribution system 130.

A content provider can interact with the content distribution system 130 through the content provider device 110. The content provider device 110 can be a personal or mobile computing device, such as a smartphone, a tablet, a laptop computer, or desktop computer. In some embodiments, the content provider device 110 includes a computer system In some embodiments, the content provider device 110 executes a client application that uses an application programming interface (API) to communicate with the content distribution system 130 through the network 120. The content provider uses the content provider device 110 to create and provide content items to the content distribution system 130. Content items are pieces of content that the content provider generates and provides to the content distribution system 130 for distribution to users of the content distribution system. Content items can include a page post, a status update, a photograph, a video, a link, a shared content item, a gaming application achievement, a check-in event at a local business, a brand page, or any other type of content.

The content provider can additionally use the content provider device 110 to offer content value to the content distribution system 130 in exchange for presenting content items to users of the content distribution system 130. Content value is a value that can be exchanged between the content provider and the content distribution system 130 to improve the placement of content items associated with the content provider. In some embodiments, the content value represents a real-world currency that is exchanged between the content provider and the content distribution system 130 to promote content items associated with the content provider. The content provider may allocate portions of content value to different content items to be used to promote the associated content items respectively. The allocated portions of content value include one-time content value offers to be offered to the content distribution system for presenting a content item once, a rate at which content value offers should be made for promoting content items, or a content value budget to be used for promoting a content item over a period of time.

The user client device 100 and the provider device 110 can communicate with the content distribution system 130 via the network 120, which may comprise any combination of local area and wide area networks employing wired or wireless communication links. In some embodiments, the network 120 uses standard communications technologies and protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any format, such as hypertext markup language (HTML) or extensible markup language (XML). In some embodiments, all or some of the communication links of the network 120 may be encrypted.

FIG. 1 also illustrates an example system architecture of a content distribution system 130, in accordance with some embodiments. The content distribution system 130 determines a content selection metric by replaying content selection processes with modified content value offers. The content distribution system 130 illustrated in FIG. 1 includes a content collection module 140, a content selection module 150, a metric determination module 160, a user interface module 170, and a data store 180. Alternate embodiments may include more, fewer, or different components from those illustrated in FIG. 1, and the functionality of each component may be divided between the components differently from the description below. Additionally, each component may perform their respective functionalities in response to a request from a human, or automatically without human intervention.

The content collection module 140 receives content items from the content provider device 110 for presentation to other users of the content distribution system 130. The content collection module 140 additionally receives content value allocations from the content provider device 110. The content collection module 140 may associate the content value allocations with content items with which the content collection module 140 received the content value allocations.

The content selection module 150 selects content to be presented to a user via a user interface displayed by the user client device 100. The content selection module 150 performs a content selection process to select one or more content items for presentation to the user. The content selection process can use a machine-learned content selection model to select content items for presentation to users. For example, the content selection process may use a neural network to select content items for presentation to users. The content selection model may select content items for presentation to the users based on features of the content items, features of the users, actions performed by the user within the content distribution system 130, or connections between users of the content distribution system 130.

The content selection module 150 additionally selects content items for presentation to users based on content value offers from content providers. When the content distribution system 130 serves a user interface to a user, the content selection module 150 can perform the content selection process to select one or more content items to be included in the user interface based on content value offers. The content selection process may include an auction process wherein the content value offers are used as bids in the auction process. The content selection process may rank content items based on the content value offers associated with the content items and the content selection model and select content items based on the ranking of the content items. If the content selection process is performed to select more than one content item to the user in a user interface, the multiple content items may be selected based on the rankings of the content values. In some embodiments, the content selection process modifies the content value offer to generate an effective content value offer for a content item to determine whether to select the content item. The content selection process can generate the effect content value by modifying the content value offer made by the content provider based on a likelihood of user interaction with the content item. The content selection process may then select content items for presentation to a user based on effective content value offers for the content items. In some embodiments, the effective content value offer is generated based on a content selection model.

In some embodiments, the content value provided to the content distribution system 130 by the content provider for presenting a content item differs from the stated content value of the content item. If multiple content items are selected to be presented in a user interface, the content selection module 150 may discount the content value provided by the content provider for selecting the content provider's content item based on where the content item is presented in the user interface served by the content distribution system 130. For example, if the user interface has a feed of content items to be presented to the user, the content value provided by the content provider for including the content provider's content item in the feed may be discounted if the content item is included in a position below the top position in the feed. The amount that the provided content value is discounted may be based on how far down the feed the content item is presented. In some embodiments, the content selection process determines a discount modifier that is applied to the content value offer The discounting of provided content value based on placement of content items in a user interface is further described in U.S. patent application Ser. No. 13/488,294, filed Jun. 4, 2012, the contents of which are incorporated by reference in their entirety.

The content selection process may use the content selection model in combination with content value offers from content providers to select content items for presentation to users. For example, the content selection process may use the content selection model to determine a likelihood that a user will interact with a content item and may generate a modifier for the content value offer associated with the content item that adjusts the content item's position in a ranking of content items. Additionally, the content selection process may require that a user have a threshold likelihood for interacting with a content item for the content item to be selected. The selection of content items associated with content value offers based on content selection models is described in U.S. patent application Ser. No. 13/545,26, fined on Jul. 10, 2012, the contents of which are incorporated by reference in their entirety.

The metric determination module 160 determines a content selection metric for the content distribution system 130. The content selection metric represents a measure of whether the content selection process used by the content selection module 150 obtains selection results consistent with the stated value of a content item. For example, the content selection metric may represent an extent to which a content provider who acts according to their true preferences (i.e., the stated value is the actual value to the provider) can achieve the best outcome within the content distribution system 130 by using the true preference as a stated value for the content. In some embodiments, the content selection metric represents the degree to which a content provider achieves an optimal outcome for presenting a content item by making a content value offer that corresponds with the true value to the content provider of presenting the content item to users. For example, if the content value represents a real-world currency, the content selection metric may represent the degree to which the content provider maximizes a profit by bidding an offer that corresponds with the true monetary value of presenting the content item. The metric determination module 160 may determine the stated true value or "stated value" of presenting a content item by using a first content value offer that the content provider makes for presenting the content item or may use the most recent content value offer made by the content provider as the stated value of presenting the content item. The metric determination module 160 also may determine the stated value of presenting a content item by prompting the content provider to provide the metric determination module 160 with the stated value of presenting the content item to users of the content distribution system.

The metric determination module 160 compares net content values of instances where the content selection process is performed to alternative net content values where the content selection process instances are re-performed. The metric determination module 160 may determine the net content value to the content provider for a performance of the content selection process based on the stated value of presenting the content item and the actual content value that the content provider provided to the content distribution system for presenting the content item. The actual content value may differ from the stated content value or the content value offered by the content provider for the presenting the content item. For example, the metric determination module 160 may use the following equation to calculate the net content value:

$$NCV = SV*DM - AV$$

where NCV is the net content value, SV is the stated content value of presenting the content item, DM is a discount modifier, and AV is the actual content value provided to the content distribution system 130 by the content provider for presenting the content item. The discount modifier discounts the stated value of presenting the content item based on where in a user interface the content item is presented. For example, if the content item is presented at a low position in a feed of content items, the discount modifier may discount the stated value of presenting the content item significantly.

The metric determination module 160 compares the net content values of content items to their corresponding alternative net content values that are determined by re-performing the content selection process with modified content value offers. The metric determination module 160 applies a set of content value modifiers to the content value offers that content providers make for presenting content items. The set of content modifiers may include percentages or actual values by which the content offer is adjusted, and may increase or decrease the content value offer.

The metric determination module 160 generates sets of modified content value offers by applying the set of content value modifiers to the content value offers made by the content providers and re-performs the content selection processes with each of the modified content value offers as the content value offers made by the content providers. When re-performing the content selection processes, the metric determination module 160 may keep all factors that may influence the content selection processes constant from the original content selection processes. For example, the metric determination module 160 may reuse content value offers from other content providers when re-performing the content selection processes. The metric determination module 160 then determines an alternative net content value for each re-performed content selection process based on the modified content value offers and the stated value of presenting the content item.

To generate the content selection metric, the metric determination module 160 repeatedly re-performs the content selection processes for a plurality of content items from content providers. For each of the plurality of content items, the metric determination module 160 generates an original net content value that is based on the original content value offer and a set of alternative net content values that is based on a set of modified content value offers. The metric determination module 160 compares the original net content value of each content item to the alternative net content values of each content item to determine whether any of the alternative net content values exceed the original net content value. The metric determination module 160 then determines the content selection metric based on the number of alternative net content values that exceed their corresponding original net content values. The content selection metric is inversely related to the number of alternative net content values that exceed their corresponding original net content values. In other words, the content selection metric may be increased when a low number of alternative net content values exceed their corresponding original net content value and may be decreased when a high number of alternative net content values exceed their corresponding original net content value. In some embodiments, the content selection metric may be determined based on the number or percentage of alternative net content values that exceed their corresponding original net content values for each content item.

The metric determination module 160 may continually update the content selection metric based on new content selection processes that are performed to select content for presentation to users of the content distribution system 130. The metric determination module 160 may update the content selection metric at regular time intervals, when the content selection model or content selection process is updated, or when a user is served a user interface from the content distribution system 130.

The user interface module 170 links the content distribution system 130 via the network 120 to the user client device 100 and the content provider device 110. The user interface module 170 serves web pages, as well as other web-related content, such as JAVA®, FLASH®, XML, and so forth. The user interface module 170 may receive and route messages between the content distribution system 130 and the user client device 100 or content provider device 110, for example, instant messages, queued messages (e.g., email), text messages, short message service (SMS) messages, or messages sent using any other suitable messaging technique. A user may send a request to the user interface module 170 to upload information (e.g., images or videos) that are stored in the date store 180. Additionally, the user interface module 170 may provide application programming interface (API) functionality to send data directly to native client device operating systems, such as IOS®, ANDROID™, WEBOS®, or RIM®.

The user interface module 170 serves user interfaces to users via user client devices 100. The user interfaces include content items from users and from content providers. In some embodiments, the user interface module 170 receives content items for presentation to users from the content selection module 150 and the user interface module 170 generates a user interface to be presented to the user via the user client device 100. The user interface module 170 may also receive interactions of the user with presented content items and may store the interactions in the data store 180.

The data store 180 stores data used by the content distribution system 130 to present content to users and to determine a content selection metric. The data store 180 stores content items received from the user client device 100 and the content provider device 110, as well as interactions of the user with the content items. The data store 180 also stores accounts that indicate amounts of content value that are assigned to content providers, and the data store 180 can update an account when a content provider provides content value to the content distribution system 130. The data store further stores machine-learned models used by the content distribution system 130 to select content items for presentation to users of the content distribution system 130, such as the content selection model.

Example Determination of Net Content Values

Figure 2:
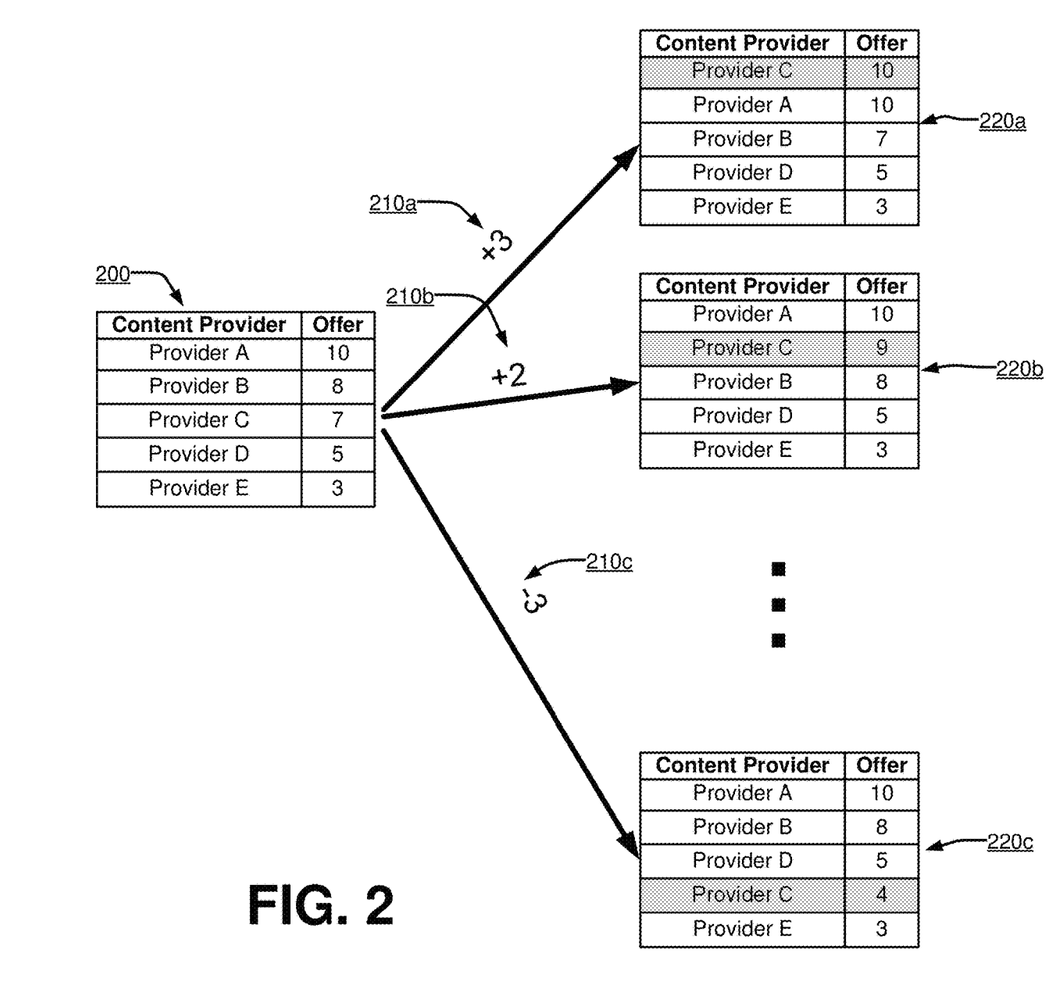
FIG. 2 illustrates example re-performed content selection processes, in accordance with some embodiments.

FIG. 2 illustrates example re-performed content selection processes, in accordance with some embodiments. A content selection process is performed to select content for presenting to user via a user interface served by the content distribution system 130. A content item for Content Provider C is included in the content selection process. The ranked results 200 for the content selection process are illustrated along with the content value offer made by each content provider. The content items from the content providers may be presented in a content item feed in an order that is based on the rankings in the results from the content selection process. For example, in FIG. 2, Content Provider C made a content value offer of 7 and ranked in the third position in the content selection process results.

The content distribution system 130 applies content value modifiers 210 to the content value offer made by the content provider and re-performs the content selection process using the modified content value offers. The results 220 of the re-performed content selection processes are illustrated in FIG. 2.

Figure 3:
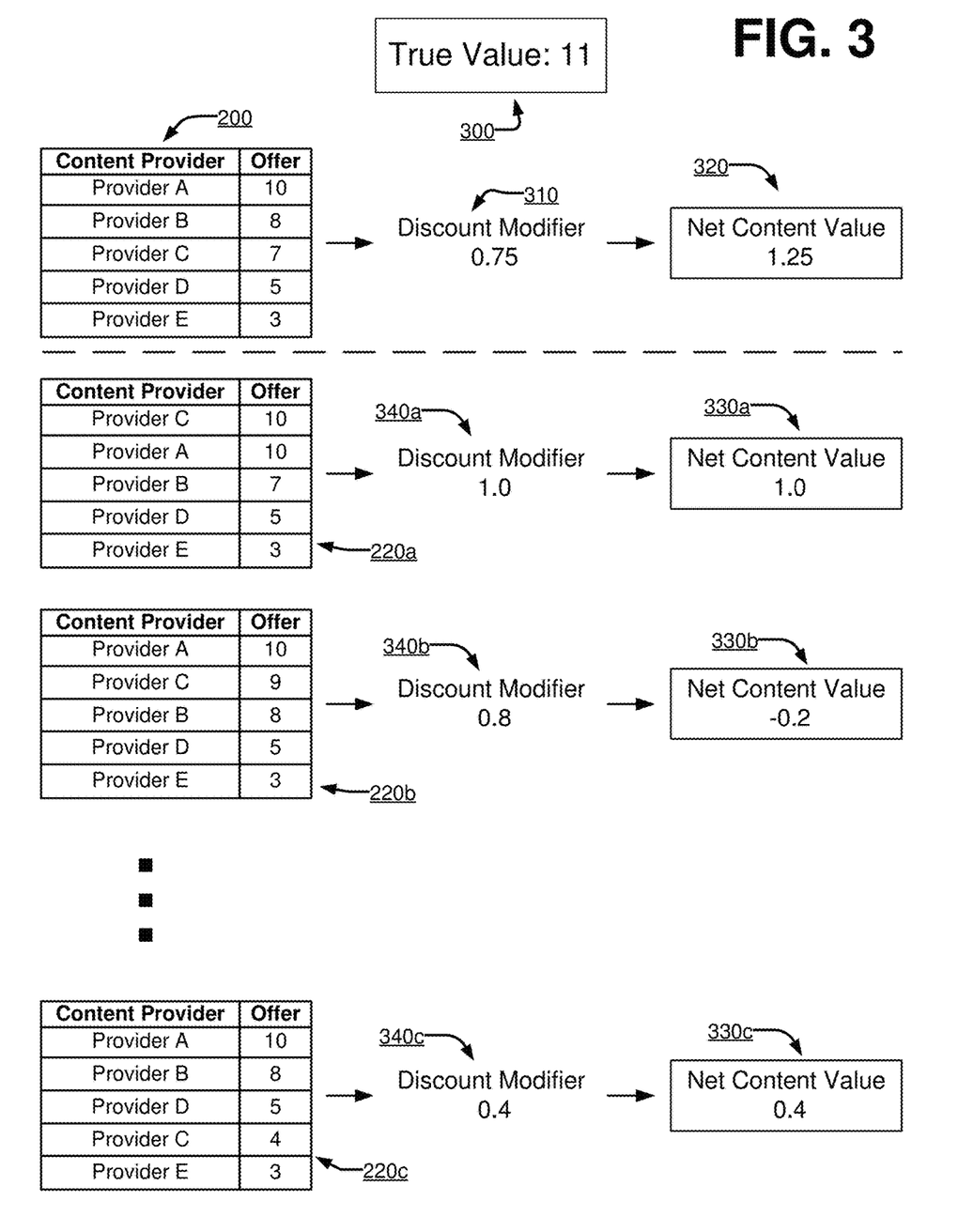
FIG. 3 illustrates an example calculation of net content values for an original content selection process and re-performed versions of the content selection process, in accordance with some embodiments.

FIG. 3 illustrates an example calculation of net content values for an original content selection process and re-performed versions of the content selection process, in accordance with some embodiments. The results 200 of the content selection process are used to calculate a net content value for Content Provider C. The content distribution system 130 uses the stated content value 300 of the content item provided by Content Provider C and a discount modifier 310 to determine the net content value. In the embodiment illustrated by FIG. 3, the content distribution system uses the following equation to calculate the net content value:

$$NCV = TV*DM - AV$$

where NCV is the net content value, TV is the stated value of presenting the content item, DM is a discount modifier, and AV is the actual content value provided to the content distribution system 130 by the content provider for presenting the content item (which, in the case of FIG. 3, is the content value offer made by Content Provider C). The content distribution system 130 thereby calculates a net content value 320 of 1.25 for the original content selection process.

The content distribution system 130 also uses the results 220 of the re-performed content selection processes to calculate alternative net content values 330. The content distribution system 130 applies a discount modifier 340 to the stated value of Content Provider C's content item and, using the equation above, calculates an alternative net content values 330 that correspond to the results 220 of the re-performed content selection processes. The content distribution system 130 can thus use the original net content value 320 and the alternative net content values 330 to determine or update a content selection metric for the content distribution system 130.

Example Method for Determining a Content Selection Metric

Figure 4:
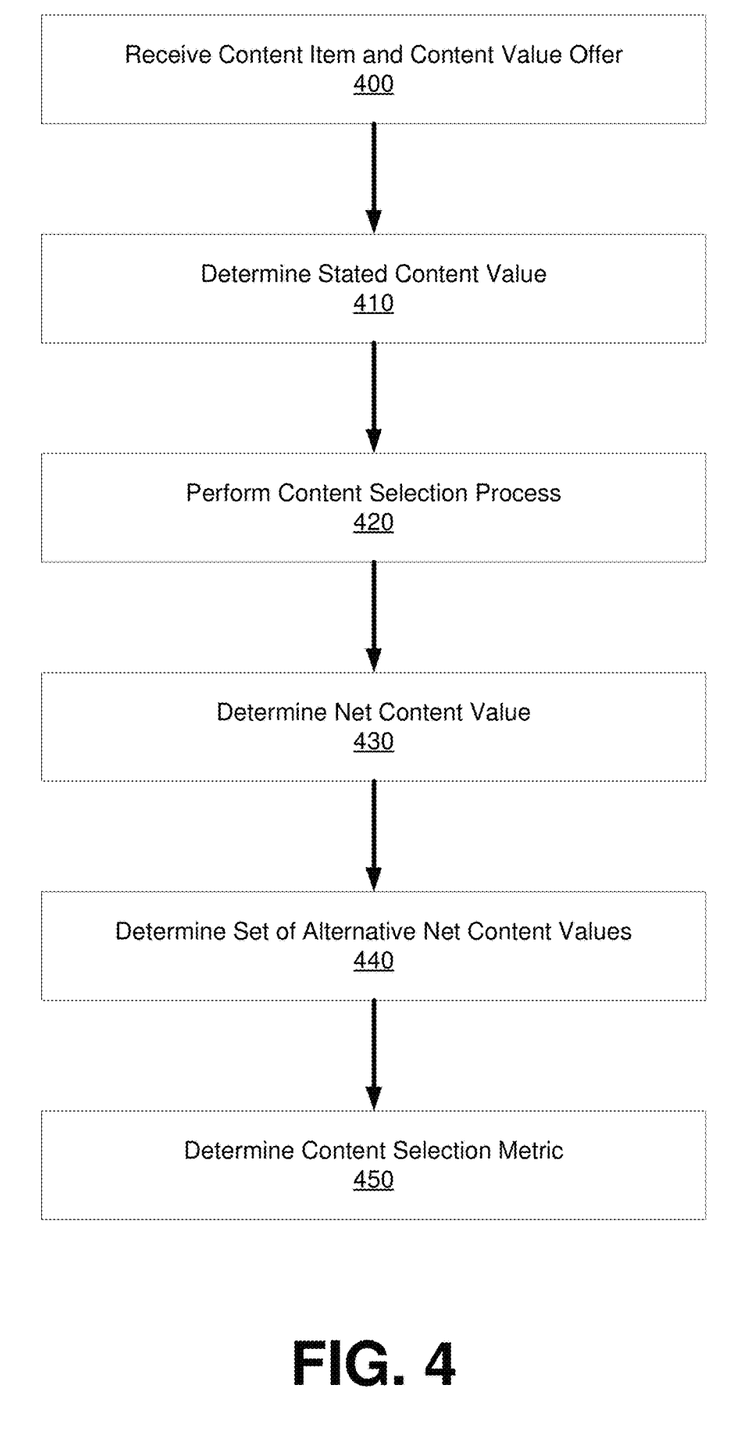
FIG. 4 is a flowchart for a method of determining a content selection metric by a content distribution system, in accordance with some embodiments.

FIG. 4 is a flowchart for a method of determining a content selection metric by a content distribution system 130, in accordance with some embodiments. Alternate embodiments may include more, fewer, or different steps from those illustrated in FIG. 4, and the steps may be performed in a different order from that illustrated in FIG. 4. Additionally, each of these steps may be performed automatically by the content distribution system without human intervention.

The content distribution system receives 400 a content item and a content value offer from a content provider. The content distribution system determines 410 the stated content value to the content provider of presenting the content item to users of the content distribution system and performs 420 a content selection process to select a set of content items to present to a user in a user interface. The content distribution system determines 430 a net content value for the content provider based on the content selection process and the determined stated content value of presenting the content item.

The content distribution system determines 440 a set of alternative net content values by re-performing the content selection process with modified content value offers. The modified content value offers may be modified based on a set of modifiers. The content distribution system determines 440 the set of alternative net content values based on the stated content value of the content item and the re-performed content selection processes and determines 450 a content selection metric based on the original net content value and the set of alternative net content values.

ADDITIONAL CONSIDERATIONS

The foregoing description of the embodiments has been presented for the purpose of illustration; it is not intended to be exhaustive or to limit the patent rights to the precise pages disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    receiving, at a content distribution system, a content item and a content value offer from a content provider, the content value offer indicating an amount of content value offered by the content provider for presenting the content item;
    determining a stated content value for the content item based on the content value offer;
    ranking a set of content items for presentation to a user of the content distribution system based on respective stated content values of the set of content items, the set of content items comprising the received content item from the content provider;

determining a net content value to the content provider of presenting the content item to the user, the net content value being determined based on the stated content value, the net content value associated with the ranking;

determining a set of alternative net content values for the content provider, each alternative net content value is determined by:

calculating a modified content value offer based on a modifier, re-ranking the set of content items for presentation to the user of the content distribution system based on the modified content value offer, and determining the alternative net content value based on the stated content value, the alternative net content value associated with the re-ranking; and determining a content selection metric based on the net content value and the set of alternative net content values, the content selection metric representing a measure of whether the ranking obtains selection results consistent with the stated value of a content item.

2. The method of claim 1, wherein the stated content value is the content value offer received from the content provider.

3. The method of claim 1, wherein determining the stated content value comprises: receiving the stated content value from the content provider.

4. The method of claim 1, wherein performing the content selection process comprises: applying a content selection model.

5. The method of claim 1, wherein ranking the set of content items for presentation comprises: comparing the content value offer to content value offers from other content providers.

6. The method of claim 1, wherein the modifier is of a set of modifiers, the set of modifiers comprising one or more values by which the content value offer is modified.

7. The method of claim 1, wherein the modifier is of a set of modifiers, the set of modifiers comprising one or more percentages by which the content value offer is modified.

8. The method of claim 1, wherein re-ranking the set of content items for presentation comprises: holding one or more of the respective stated content values of the set of content items constant.

9. The method of claim 1, wherein determining the content selection metric comprises: determining a count of the set of alternative net content values that exceed the net content value.

10. The method of claim 1, wherein determining the content selection metric comprises: determining a percentage of the set of alternative net content values that exceed the net content value.

11. The method of claim 1, wherein the content value offer represents an amount of real-world currency to be paid to the content distribution system.

12. The method of claim 1, wherein the content selection metric is determined based on a plurality of net content values and a plurality of sets of alternative net content values, each net content value of the plurality of net content corresponding to a set of alternative net content values of the plurality of sets of alternative net content values.

13. A non-transitory, computer-readable medium comprising instructions that, when executed by a processor, cause the processor to:

receive, at a content distribution system, a content item and a content value offer from a content provider, the content value offer indicating an amount of content value offered by the content provider for presenting the content item;

determine a stated content value for the content item based on the content value offer;

rank a set of content items for presentation to a user of the content distribution system based on respective stated content values of the set of content items, the set of content items comprising the received content item from the content provider;

determine a net content value to the content provider of presenting the content item to the user, the net content value being determined based on the stated content value, the net content value associated with the ranking;

determine a set of alternative net content values for the content provider, each alternative net content value is determined by:

calculate a modified content value offer based on a modifier, re-rank the set of content items for presentation to the user of the content distribution system based on the modified content value offer, and determine the alternative net content value based on the stated content value, the alternative net content value associated with the re-ranking; and determine a content selection metric based on the net content value and the set of alternative net content values, the content selection metric representing a measure of whether the ranking obtains selection results consistent with the stated value of a content item.

14. The computer-readable medium of claim 13, wherein the modifier is of a set of modifiers, the set of modifiers comprising one or more values by which the content value offer is modified.

15. The computer-readable medium of claim 13, wherein the modifier is of a set of modifiers, the set of modifiers comprising one or more percentages by which the content value offer is modified.

16. The computer-readable medium of claim 13, wherein re-ranking the set of content items for presentation comprises: holding one or more of the respective stated content values of the set of content items constant.

17. The computer-readable medium of claim 13, wherein determining the content selection metric comprises: determining a count of the set of alternative net content values that exceed the net content value.

18. The computer-readable medium of claim 13, wherein determining the content selection metric comprises: determining a percentage of the set of alternative net content values that exceed the net content value.

19. The computer-readable medium of claim 13, wherein the content value offer represents an amount of real-world currency to be paid to the content distribution system.

20. The computer-readable medium of claim 13, wherein the content selection metric is determined based on a plurality of net content values and a plurality of sets of alternative net content values, each net content value of the plurality of net content corresponding to a set of alternative net content values of the plurality of sets of alternative net content values.

* * * * *